INVENTOR.
HARRY I. ABBOUD
BY Llewellyn A. Proctor
ATTORNEY

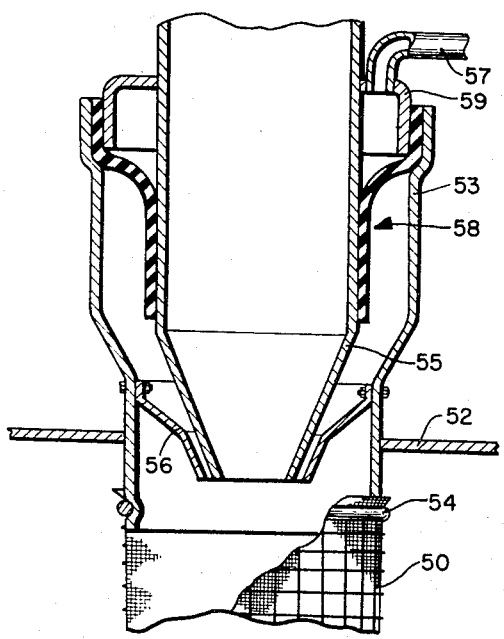
FIG. 4.
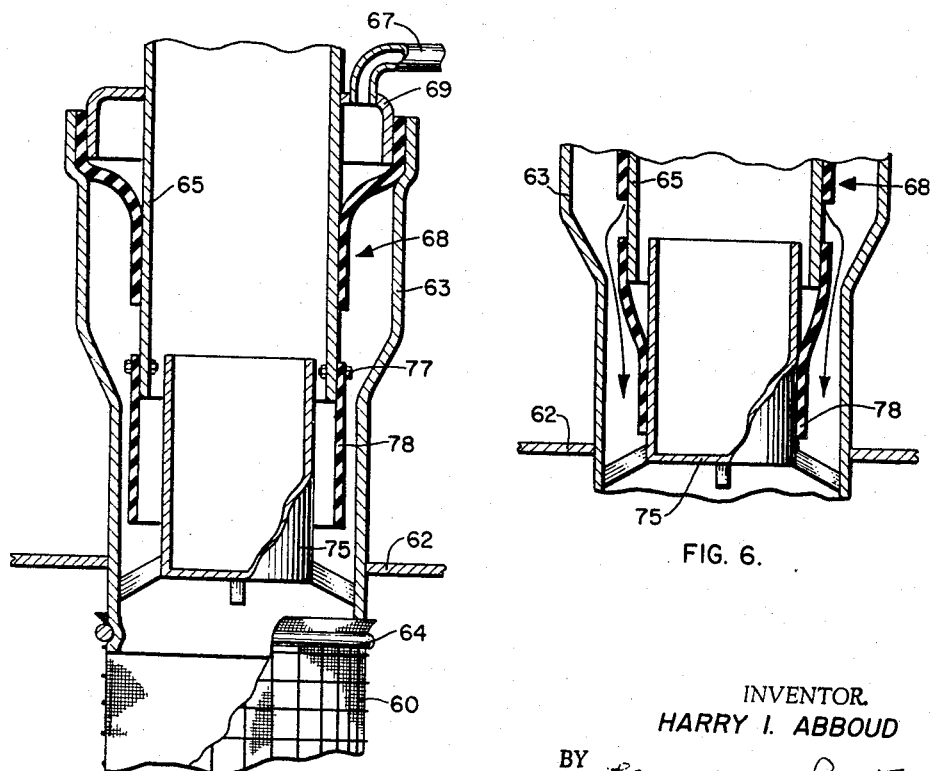
FIG. 5.
FIG. 6.
INVENTOR.
HARRY I. ABBOUD
BY Llewellyn A. Proxton
ATTORNEY

United States Patent Office 3,429,106
Patented Feb. 25, 1969

3,429,106
AEROSOL FILTERING APPARATUS
Harry I. Abboud, 5845 Clematis,
Baton Rouge, La. 70808
Continuation-in-part of application Ser. No. 381,407,
July 9, 1964. This application May 22, 1967, Ser.
No. 640,146
U.S. Cl. 55—292                                    11 Claims
Int. Cl. B01d 29/28

ABSTRACT OF THE DISCLOSURE

A gas cleaning apparatus connected to the mouth of a filter bag wherein the gas cleaning apparatus includes coaxial tubular members, the inner being provided with a restriction at the bottom.

---

This invention, relating to improvements in aerosol filtering apparatus, is a continuation-in-part of pending application Ser. No. 381,407, filed July 9, 1964, now U.S. Patent No. 3,333,401.

This invention is, in particular, an improvement over the apparatus disclosed and claimed in that application. The improved apparatus contemplates, in brief, a pair of tubular elements spaced apart and concentrically mounted one with respect to the other to provide an annular space or opening between the walls of the two elements. The upper wall portions of the two elements are joined, and means are provided for the admission of compressed air or gas to the annular space. The lower portion of the inner tubular element is provided with a restricted opening (or openings) which lies adjacent to the lower portion of said annular opening between the walls of the two members. The location and arrangement of these openings is such that, in an ordinary filtering operation, gas ascends through the restricted opening, and through the inner tubular element. In a cleaning or purging operation, however, the flow of compressed air or gas into the annular opening interrupts or reverses the flow of gas through the inner tubular element.

In a preferred feature, a distendable sleeve of resilient material surrounds the inner tubular element. In certain embodiments the sleeve, or a separate sleeve, aids in reversing the flow of gas through the tubular element. The apparatus is preferably used in association with, and is operatively communicated to a bag filter element. Gas supplied within the annular space, and beneath the sleeve and tubular element, generates gas wave pulsations and mechanical vibrations which act upon the bag filter element, during purge, to dislodge particles therefrom. During the purge, also, gases are forced past the restricted opening, to generate sufficient back pressure to interrupt the filtering operation. In certain embodiments the distendable sleeve itself physically blocks the flow of gas through the restricted opening.

In presently used apparatus, aerosols or dust-bearing gases are generally cleaned by passing dirty process gas through fabric filters. Fabric bags are disposed across the flow path of the gas to act as filters for removal of dust from the gases. The process gas penetrates the fabric while passage of the aerosols or dust particles through the pores of the fabric is prevented, at least in part, due to the smallness of the pore size.

In typical installations, a housing is divided into separate compartments or chambers by a partitioning member containing at least one, and generally, a plurality of openings therethrough. Gas inlet means is provided in one chamber and gas outlet means in the other. The openings define flow paths (pattern) for process gases passing from one compartment to the other. Tubular shaped bags, each having an open and a closed end, are placed across the partition openings so that the dust-laden process gases must pass through the bag fabric.

Upon injection of the dust-laden process gases into a compartment, the gas penetrates the partitioning bags to enter the next compartment. In this filtering or cleaning action, the dust is retained on the surfaces of the partitioning bags, which constitute filter elements.

In the filtering operation, the pores of the bags quite quickly become clogged, at least partially, and further filtering action is reduced, or ceases altogether. For this reason, it is absolutely essential, and it is conventional practice to periodically frequently clean the bags. This is generally done by providing an operating cycle, a sequence of which includes alternating filtering and cleaning or purging steps. In the filtering step the dust is removed from the dust-laden process gas by the above described filtering action. In the cleaning or purging step the dust is removed from the pores of the fabric bags so that the latter can be reused for filtering. In the purging step the process gas flow is often interrupted or reversed to dislodge dust particles from the pores of the fabric. Often the purging action can, e.g. be performed by mechanical agitation of the bags, reversal of the direction of gas flow, by sonic and ultra sonic vibrations, or by combinations of these and other methods.

In copending application Ser. No. 381,407 there is disclosed a device useful in cleaning or purging dust or solids from the walls of the bag filter elements. The device is constituted of a distendable sleeve of resilient material which surrounds a tubular element or nozzle. Means are provided for injecting gas, usually at high pressure, into a space between the distendable sleeve and extended wall of the tubular element. Gas so injected will exit from the annular space between the sleeve and wall of the tubular element. The apparatus can be used in association with and is operatively communicated with a bag filter element and an injected high pressure gas will generate gas wave pulsations and mechanical vibrations to dislodge dust from the pores of the bag filter element.

While this device has proven successful, the primary objective of the present invention is to provide an improved device which, inter alia, considerably improves and intensifies the back pressure generated upon reversal of process gas flow following the filtering portion of the operating cycle.

This object and others is achieved in accordance with the present invention which contemplates a new and novel gas-activated structure for location upon a vertically suspended filter bag which, in a preferred embodiment cleans the bag by dislodging filtered dusts or solids from the bag surface. The gas activated structure comprises a pair of generally tubular shaped elements of relatively short length. The elements are spaced apart and concentrically mounted one with respect to the other to provide an annular space, opening, or clearance between the walls of the two tubular elements. The outer element encloses or surrounds the inner element, the top or upper portions of the two elements are joined together, and means are provided for admission of compressed air or gas to the partially enclosed annular space. The opening though the bottom of the inner tubular element is partially restricted, and the restricted opening lies adjacent to the lower portion of the annular space or opening formed between the walls of the inner and outer tubular elements. The arrangement of these openings— viz. the said restricted and annular openings—is such that in an ordinary filtering operation process gas ascends through the restricted opening, and through the inner tubular element. On the other hand, in a purging operation, the flow of process gas is interrupted and even reversed by injection of compressed air or gas into the annular opening.

A key and novel feature of the apparatus combination is concerned with the size or cross-sectional area of the restricted opening relative to the sum-total cross-section through the inner tubular element. The cross-sectional area of the restricted opening (or openings) ranges from about 1/20 to about 1/2, and preferably from about 1/10 to about 1/4 of the larger cross-sectional area of the said inner tubular member. Injection of compressed air through the adjacent annular space interrupts or reverses ascent of process gas through the restricted opening.

In a further preferred embodiment a distendable element is mounted within the upper portion of the annular space. At least a portion of the distendable member is fitted against and grips the inner tubular member or nozzle, and means are provided for injection of high pressure gas between the nozzle and the distendable member to create vibratory or pulsating release of the gas by relatively high frequency dilations of the resilient member.

An annular space, which is a sub-division of the larger annular space, is provided between the surrounding distendable member and the external wall of the inner tubular member or nozzle. The space is entirely enclosed but for an annular opening located at the junction wherein the distendable member grips the external wall of the inner tubular member or nozzle. Means are provided for injection of gas, at relatively high pressure, into the space. Release of gas into the space creates pulsations and vibrations by action of the distendable member. At the terminal end of the nozzle, and adjacent the annular opening is provided a restricted opening for ascent of process gas therethrough. The openings are so situated one to the other that release of the high pressure gas through the annular opening can interrupt and reverse the flow of process gas through the restricted opening.

In a preferred embodiment the distendable member can be extended sufficiently far to physically block the ascent of process gas into the restricted opening. In another, a separate flexible member is provided to block the ascent of the process gas into the restricted opening.

The invention will be better understood by reference to the attached drawings to which reference is made in the following more detailed description.

In the figures:

FIG. 4 depicts an elevation view, in partial section, of an especially preferred embodiment of the invention;

FIG. 5 depicts a partially sectioned, elevation illustration of a portion of a bag filter installation of the outside filtering type, in which the cleaning apparatus of the present invention is applied or positioned at the upper end of the filter tubes, and FIG. 6 depicts a fragmentary view giving details of a portion of the gas activated structure of FIGURE 5.

Figure 1:
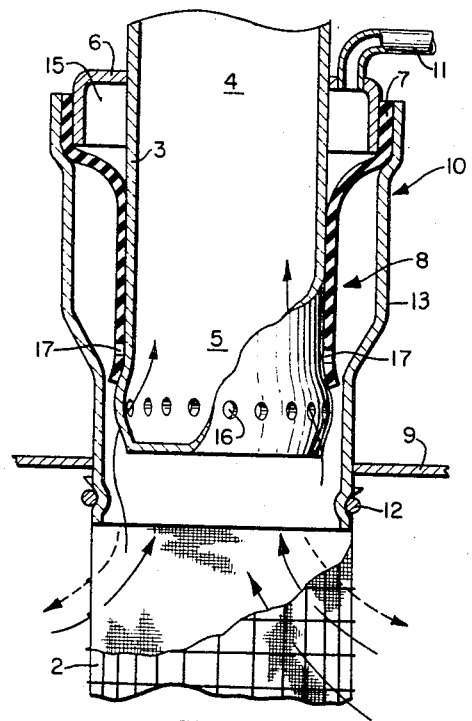
FIG. 1 depicts a partially sectioned elevation view of a typical embodiment of the invention, a gas activated structure being positioned at the top of a filter bag.
Figure 3:
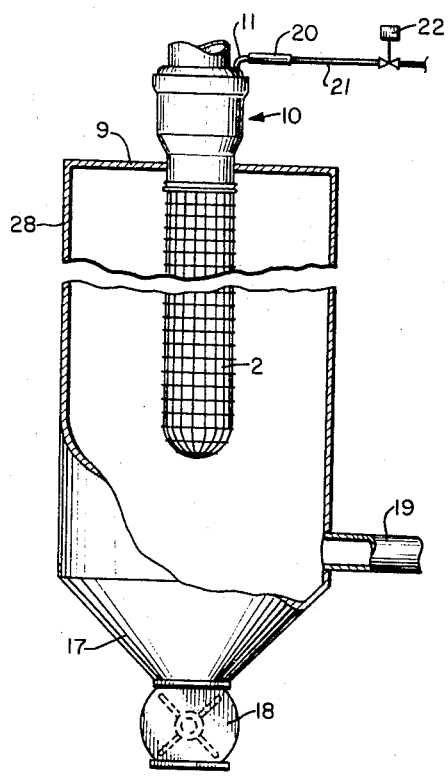
FIG. 3 depicts an elevation view showing a single bag of a filtering installation, as in using the cleaning apparatus of FIGURE 1.

Referring to FIGURES 1 and 3 is shown one of the preferred types of gas activated structure 10 in operative attachment to the upper end of a bag 2 of the outside filtering type. In the installation, e.g., a dirty gas feed space is separated by a roof plate 9. The bag 2 is vertically suspended from a roof plate 9 of a filter casing or chamber 28. In effect, the plate 9 divides a clean gas space from a dirty gas space, and an aperture in the plate 9 is occupied by the gas activated structure 10.

An inlet tube 11 for supplying compressed gas is connected by a flexible tubing 20 to a supply line 21. A motorized valve 22 regulates the amount of air received from said supply line. The lower part of the filter casing 28 is terminated by a hopper section 17 in which is collected the dusts removed from the surface of the filter bag 2 during the operation.

A star valve assembly 18 is provided at the lower end of hopper 17 for discharge of the dusts to an external container (not shown) wtihout permitting significant gas passage. Dirty gas is supplied through line 19.

During a cleaning cycle, activating compressed gas is supplied to the cleaning mechanism through line 11, by timed operation of the valve 22. Typical cleaning cycles are for periods of .15 second to .5 minute, at intervals from about 1 minute to 30 minutes of normal filtering time.

It will be understood, in most installations, instead of one filter tube in a shell as shown in FIGURE 3, a substantial number of, e.g. 40 to 1,000, are employed, closely spaced for maximum capacity. Customarily, also, a group of such multiple bag units are provided, operating in parallel with the cleaning cycles sequentially staggered and with cyclic operations governed by an appropriate timing mechanism.

The gas activated structure is projected through an opening within plate 9, and provides a flow path for ascending process gases, as indicated by the solid arrows. During normal filtering, the bag 2 filters solids or dusts from the dirty process gas, the clean gas ascending through the interior of bag 2 while dust solids are retained on the outside of the bag 2.

The gas activated structure 10 is comprised of two generally concentric tubular elements, an inner tubular element 3 and an outer tubular element 13, each separated one from the other to provide an annular space between the external wall of member 3 and the inside wall of member 13. The top of the filter bag 2 is secured to the member 13 by means of a clamping ring 12. The upper portions of the two tubular elements 3, 13 are joined together, the enclosed space being provided with a line 11 for supplying air to the annular space. In an optional, but preferred feature, a distendable member 8 is provided within the upper portion of the annular space to produce mechanical vibrations and gas pulsations to aid in the cleaning of the bag 2.

The tubular element or nozzle 3 is preferably of metal, and has an upper portion 4 and lower portion 5. The external wall of the upper portion 4 is provided with an inverted trough or U-shaped member 6 which surrounds the tubular element 3. The nozzle 3 and U-shaped member 6 are enclosed by external member 13, also generally of tubular shape. The upper section of the external tubular member 13 can be of sufficiently large diameter for convenient optional location of a distendable member 8 therein. In the aggregate assembly the distendable element 8 entirely surrounds the nozzle 3, touching and gripping the nozzle 3 tightly at its lower portion. A space 15 is left within the annular space between the distendable element 8 and the external wall of nozzle 3, and gas inlet 11 provides means for injection of compressed air or gas into the space 15.

The distendable element 8 can be conveniently secured within the wall of external tubular element 13 by means of a connecting ring portion 7 and a curved skirt segment portion which extends to and grips the external wall of nozzle 3. The connecting ring 7 is a gasket-like segment which snugly engages between the upper portion of the external tubular member 13 and U-shaped member 6 to form an air-tight fit.

The lower section of the inner tubular element 3 is shaped to form a narrow venturi section between itself and the outer tubular element 13. The lower end of the inner tubular element 3 is closed but provided with a series of small openings 16 located around its periphery just below the vena-contracta of the venturi section to allow passage of clean gas from the filter bag 2.

In the purge, or cleaning portion of the operating cycle, compressed gas flows through the venturi section in the annular space and seals the peripheral openings 16 by venturi action and aspirates clean gas through them to reverse flow through the filter medium and purge the dust cake off the filter fabric surface 2.

Figure 2:
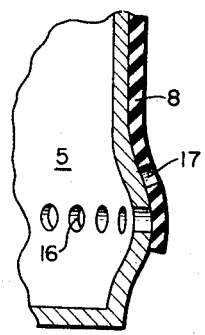
FIG. 2 depicts a fragmentary side view giving details of a portion of the gas activated structure of FIGURE 1.

In the said optional but preferred embodiment the distendable element 8 can be caused to extend over and cover the peripheral openings 16 to seal off the flow of clean gas therethrough. Thus, in the filtering step the distendable element 8 is located above the openings 16 (FIGURE 1), but upon injection of high pressure gas during the purging the member 8 extends sufficiently far enough downwardly to cover the openings 16 (FIGURE 2). The compressed gas flows from chamber 15 underneath the element 8 and exits via openings 17 to the venturi section.

The distendable element 8 is made of a resilient material, usually rubber or a synthetic resilient heat resistant elastomer such as neoprene, nylon, polypropylene or other long lasting plastic or elastic resin.

In operation, during normal filtering, dirty gas is thus injected into the dirty gas chamber. The gas contacts the filter bag 2 where the gas is filtered of dusts by passage through the fabric walls. Dust solids are retained on the external surface of the bag 2, while clean gas ascends through nozzle 3. No activating gas is supplied through the feed tube 11 during such normal filtering.

At periodic intervals, a purge lasting for a fraction of a second, or from some several seconds to several minutes is carried out. During the purge, the normal gas differential pressure is desirably, but not essentially, reversed, by means described, to cause a reverse pressure drop across the filter bag wall 2, as indicated by the dotted arrows.

The purge is initiated by injection of compressed gas through gas line 11. Gas, which can range from a pressure of several pounds to several hundred pounds per square inch, enters chamber 15 and escapes through the annulus formed between the external wall of nozzle 3 and outer tubular member 13. Where the distensable element 8 is employed, the escaping gas passes under this member causing not only its extension, but also vibrations which aid in the cleaning. The rapidity of such vibrations can be caused to vary from the sub-sonic to ultra-sonic frequency, viz., from about several to several thousand cycles per second.

Gas wave energy is also produced, and the gas wave energy thus established radiates downwardly through the interior of the filter bag 2 to agitate the dust deposited on the outer face of the bag 2.

The relatively high velocity activating gas passes downwardly through the annular space and venturi section to provide an aspirating or entraining action to the process gas in the lower portion of the nozzle member, whereby its static pressure is decreased, or reverse gas flow is initiated, as indicated by the dotted arrows.

A feature of the invention resides in the provision of a restricted passage for ascent of process gas through the nozzle 3. In this particular embodiment the restricted passage is provided by the sum-total cross-sectional area of the plurality of peripheral openings 16. The sum-total cross-sectional area provided in such restricted passage should range from about $1/20$ to about $1/2$, and preferably from about $1/10$ to about $1/4$, of the total cross-sectional area provided by the upper portion or outlet portion 4 of the nozzle 3. This provides proper activation of the said structure when differential pressures between the cleaning cycle and purge cycle ranges from about 2 to about 15 inches of water, and especially when the differential pressure ranges from about 3 to about 10 inches of water.

An even more preferred gas activated structure is shown by reference to FIGURE 4. The restricted opening in this instance is in the form of a frusto-conical shaped outlet. In this form the gas activated structure can be placed above or below the bag filter, but in this figure the structure is located above the bag as in FIGURE 1. The structure, and its mode of operation are similar to that described by reference to FIGURE 1.

In FIGURE 4, a filter bag 50 is suspended from the plate 52 of a filter bag installation. A cylindrical wire gauge is mounted inside the bag 50 to prevent collapse during normal filtering action.

The apparatus or structure includes an external tubular member 53, an inner tubular element or nozzle 55, with downwardly tapered conical outlet and a distensable member 58. The area of the restricted passage provided by the conical opening ranges from about $1/20$ to about $1/2$, and preferably from about $1/10$ to about $1/4$, of the larger cross-sectional area defined by the larger portion of the cone. The structure is in the form of two segmented members, a portion 53 and a nozzle 55 connected by an inverted, U-shaped flange portion 59. The side walls of the portion 53 provide a surface for fastening to the plate 52. The top of the bag 50 is secured to the lower end of member 53 by a clamping band 54.

The interior tubular element 55 is supported upon member 53 by flange member 59 which also supports a compressed gas inlet line 57. The lower ends of the member 55 and conical portion 56 form a narrow annular passage. The distensable member 58 normally grips the outside nozzle surface tightly. The upper end of the resilient member 58 is secured between the interior of the member 53 and the flange portion 59.

In a cleaning cycle operation, as in other embodiments, compressed gas is fed through feed line 57 and escapes by distensions of the distendable element 58, causing gas wave vibrations to emanate to the bag wall and to the dust deposits thereon, facilitating and causing release of the dust from the fabric walls. Compressed gas flows through the conical annulus formed by the lower ends of members 55, 56. The gas converges to form an inertial seal inside the bag 50 which reverses the direction of flow of the gas through the filter medium and purges the dust cake off the filter fabric surfaces.

Another preferred embodiment is illustrated by FIGURE 5 which shows an installation at the upper end of a filter bag of the outside filtering type. The gas activated device is also similar to that described by reference to FIGURE 1, except that the restricted opening for passage of the process gas is defined as an annular opening. In addition, a flexible apron is provided for physical closure of the annular passage during injection of high pressure gas or air into the apparatus.

The apparatus comprises two concentric tubular elements 63, 65. The inner element 65 is joined together with element 63 via the inverted U-shaped member or flange 69, and gas can be admitted to the annular space formed between them via line 67. A distendable member 68 is located between flange 69 and the top wall of member 63. The bottom of the inner tube 65 is partially restricted by the cylindrical plug 75 which provides an annular opening of restricted size into the bottom of inner tube 65.

A separate flexible apron 78 is attached via connections 77, extending downwardly from member 65. In the position shown in FIGURE 5 process gas passing through the bag 60 ascends underneath the apron 78 passing into the tubular member 65. Flow of compressed air into line 67 produces distension of member 68, the gas escaping underneath the member to pass into the annular opening. The pressure of the gas (FIGURE 6) produces collapse of apron 78 which shuts off the flow of process gas to the tubular member 65.

Having fully described the invention and certain embodiments thereof, what is claimed is:

1. In an installation for separating suspended dusts from gases by passage of the dirty gas through a filter bag the combination comprising:

a dust chamber defined by enclosing walls, gas inlet means for admitting dust laden gases to said dust chamber, a clean gas outlet defined by an opening through a wall at the top of the dust chamber, gas activated apparatus disposed within said clean gas outlet, including a pair of tubular elements, an inner element coaxially disposed within and spaced apart from an outer element of larger diameter which is contiguous to the wall surrounding the opening forming the clean gas outlet, including a restriction at the lower end of the smaller diameter inner tubular element to partially close the opening and provide a clean gas flowpath ranging from about $1/20$ to about $1/2$ of the cross-sectional area provided by the unrestricted opening through the said tubular element, gas injection means connected to an enclosure joining the top of the two tubular elements for supplying gas into the annular space between the said tubular elements, a vertically suspended filter bag located upon and disposed across the outer tubular element to partition the opening through the said element, and clean gas outlet, leading from the dust chamber whereby the flow of gas cleaned by passage through the filter bag, by deposition of dust on the filter bag surface during the filtering action, can be interrupted by injection of pressurized gas into the annular space to produce gas wave pulsations and mechanical vibrations of the outer tubular member to dislodge dust from the filter bag surface.

2. The combination of claim 1 wherein the lower portion of the inner tubular element of the gas activated apparatus is closed by an end wall, the lower portion of the element is bulged outwardly to form, with the outer tubular member, a venturi section, and peripheral openings are provided within the bulged portion of the inner tubular element, the sum-total cross-sectional area of which constitutes the restricted opening.

3. The combination of claim 1 wherein the lower end of the inner tubular element is converged inwardly to provide a frusto conic opening of sufficiently small cross-sectional diameter, to constitute the restricted opening.

4. The combination of claim 1 wherein the restriction in the lower end of the inner tubular element is provided by a cylindrical shaped member which physically blocks and partially closes the opening through the element leaving only a peripheral opening.

5. The combination of claim 1 wherein the restricted opening through the inner tubular element ranges from about $1/10$ to about $1/4$ of the cross-sectional area provided by the unrestricted part of the said tubular element.

6. The combination of claim 1 wherein a distendable sleeve is mounted within the enclosure about the annular space between the inner and outer tubular elements, the sleeve surrounding and tightly gripping the outside wall of the inner tubular element, and the gas injection means is positioned to provide high pressure air between the inner tubular element and the distendable sleeve.

7. In an installation for separating suspended dusts from gases by passage of the dirty gas through a filter bag the combination comprising:

a dust chamber defined by enclosing walls, gas inlet means for admitting dust laden gases to said dust chamber, a clean gas outlet defined by an opening through a wall at the top of the dust chamber, gas activated apparatus disposed within said clean gas outlet, including a pair of tubular elements, an inner element coaxially disposed within and spaced apart from an outer element of larger diameter which is contiguous to the wall surrounding the opening forming the clean gas outlet, a restriction at the lower end of the smaller diameter inner tubular element to partially close the opening and provide a clean gas flowpath ranging from about $1/20$ to about $1/2$ of the cross-sectional area provided by the unrestricted opening through the said tubular element, a distendable sleeve of resilient material surrounding and tightly gripping the outside wall of the said inner tubular element, gas injection means connected to an enclosure joining the top of the two tubular elements for supplying gas, under pressure, between the inner tubular element and the distendable sleeve, to produce a vibratory release of the gas into the annular space between the said tubular elements, a vertically suspended filter bag located upon and disposed across the outer tubular element to partition the opening through the said element, and clean gas outlet, leading from the dust chamber, whereby the flow of gas into the dust chamber is cleaned by passage through the filter bag, by deposition of dust on the filter bag surface during the filtering action, which action can be interrupted by injection of pressurized gas underneath the distendable sleeve and into the annular space to produce gas wave pulsations and mechanical vibrations of the outer tubular member to dislodge dust from the filter bag surface.

8. The combination of claim 7 wherein the lower portion of the inner tubular element of the gas activated apparatus is closed by an end wall, the lower portion of the tubular element is bulged outwardly to form, with the outer tubular element, a venturi section, and peripheral openings are provided within the bulged portion of the inner tubular element, the sum-total cross-sectional area of which constitutes the restricted opening.

9. The combination of claim 7 wherein the distendable member is sufficiently distendable to extend and cover the openings within the lower portion of the inner tubular element during injection of pressurized gas to cut off the flow of gas into the said inner tubular element.

10. The combination of claim 7 wherein the lower end of the inner tubular element converges inwardly to provide a frusto conic opening of sufficiently small cross-sectional diameter, to constitute the restricted opening.

11. The combination of claim 7 wherein the restriction in the lower end of the inner tubular element is provided by a cylindrical shaped member which partially closes the opening through the element leaving only a peripheral opening.

References Cited

UNITED STATES PATENTS

| 2,700,316 | 1/1955 | Gordon et al. | 46—179 |
|---|---|---|---|
| 3,053,031 | 9/1962 | Vedder et al. | 55—292 |
| 3,125,986 | 3/1964 | Fortman et al. | 55—15 |
| 3,333,401 | 8/1967 | Abboud | 55—293 |
| 1,118,045 | 11/1914 | Playter | 55—291 X |
| 2,156,890 | 5/1939 | Wuringer. | |
| 2,890,081 | 6/1959 | Terrett. | |
| 3,011,336 | 12/1961 | Weiss. | |
| 3,167,415 | 1/1965 | Edwards | 55—302 |

FOREIGN PATENTS

| 649,123 | 9/1962 | Canada. |
|---|---|---|
| 488,129 | 7/1938 | Great Britain. |
| 914,187 | 12/1962 | Great Britain. |
| 76,916 | 8/1951 | Norway. |

HARRY B. THORNTON, *Primary Examiner.*

BERNARD NOZICK, *Assistant Examiner.*

U.S. Cl. X.R.

55—293, 302